US012734082B2

(12) United States Patent
Huttenhuis

(10) Patent No.: US 12,734,082 B2
(45) Date of Patent: Sep. 15, 2026

(54) FOLDABLE SEATING DEVICE

(71) Applicant: P.R. Sella B.V., Denekamp (NL)

(72) Inventor: Aloysius Gerhardus Huttenhuis, Denekamp (NL)

(73) Assignee: P.R. Sella B.V., Denekamp (NL)

( * ) Notice: Subject to any disclaimer, the term of this patent is extended or adjusted under 35 U.S.C. 154(b) by 329 days.

(21) Appl. No.: 18/565,299

(22) PCT Filed: May 24, 2022

(86) PCT No.: PCT/NL2022/050283
§ 371 (c)(1),
(2) Date: Nov. 29, 2023

(87) PCT Pub. No.: WO2022/255862
PCT Pub. Date: Dec. 8, 2022

(65) Prior Publication Data

US 2024/0358567 A1 Oct. 31, 2024

(30) Foreign Application Priority Data

May 31, 2021 (NL) ...................................... 2028342

(51) Int. Cl.
*A61G 5/08* (2006.01)
*A61G 5/10* (2006.01)

(52) U.S. Cl.
CPC .......... *A61G 5/0825* (2016.11); *A61G 5/1067* (2013.01)

(58) Field of Classification Search
CPC ........ A61G 5/10; A61G 5/122; A61G 5/1067; A61G 5/0816; A61G 5/0825; A61G 5/0891
See application file for complete search history.

(56) References Cited

U.S. PATENT DOCUMENTS

| | | | | |
|---|---|---|---|---|
| 5,547,251 | A * | 8/1996 | Axelson | A61G 5/1091 297/284.7 |
| 2010/0276974 | A1 | 11/2010 | Huttenhuis | |
| 2014/0077547 | A1* | 3/2014 | Huttenhuis | A61G 5/1043 29/402.01 |
| 2014/0252747 | A1 | 9/2014 | Hermes | |
| 2016/0338889 | A1* | 11/2016 | Izutsu | A61G 5/122 |
| 2021/0030608 | A1 | 2/2021 | Brown et al. | |
| 2022/0233375 | A1* | 7/2022 | Mullins | A61G 5/0825 |

FOREIGN PATENT DOCUMENTS

| | | |
|---|---|---|
| NL | 2002388 C2 | 8/2009 |

* cited by examiner

*Primary Examiner* — Christopher B Wehrly
(74) *Attorney, Agent, or Firm* — The Webb Law Firm

(57) ABSTRACT

The invention relates to a seating device, such as for instance a chair or a wheelchair, with a seat and backrest extending between a first and a second side of the seating device for the purpose of supporting a seated person, which seating device can be folded into a collapsed position and a folded-out position. In the collapsed position the distance between the first and the second side is smaller than in the folded-out position, and which backrest includes a lumbar-thoracic support surface for supporting in the folded-out position the lumbar-thoracic transition area of a person situated in the seating device during use at a first angle relative to the horizontal plane.

5 Claims, 3 Drawing Sheets

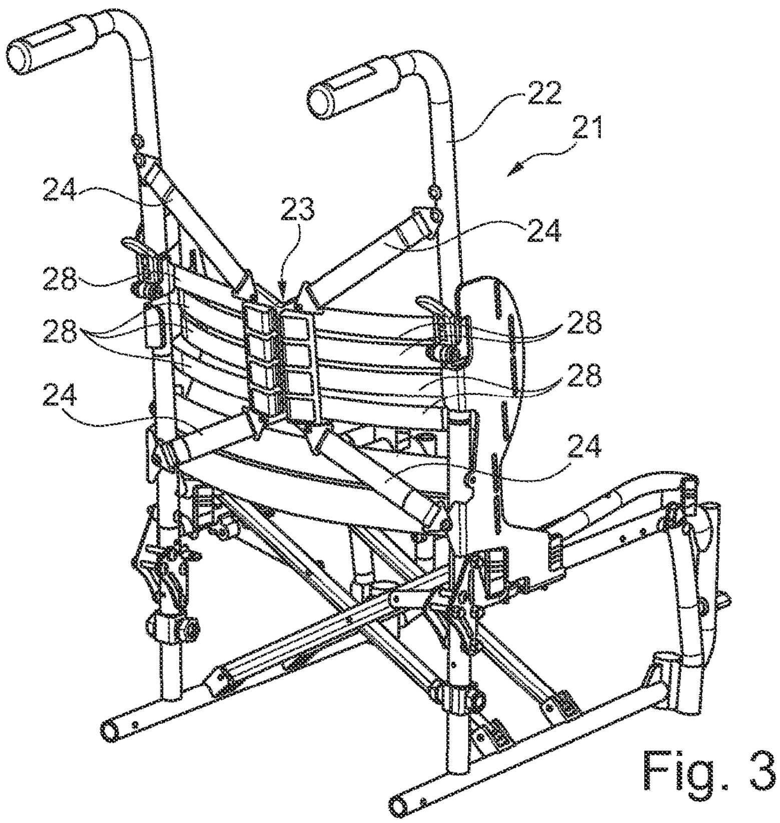
Fig. 3
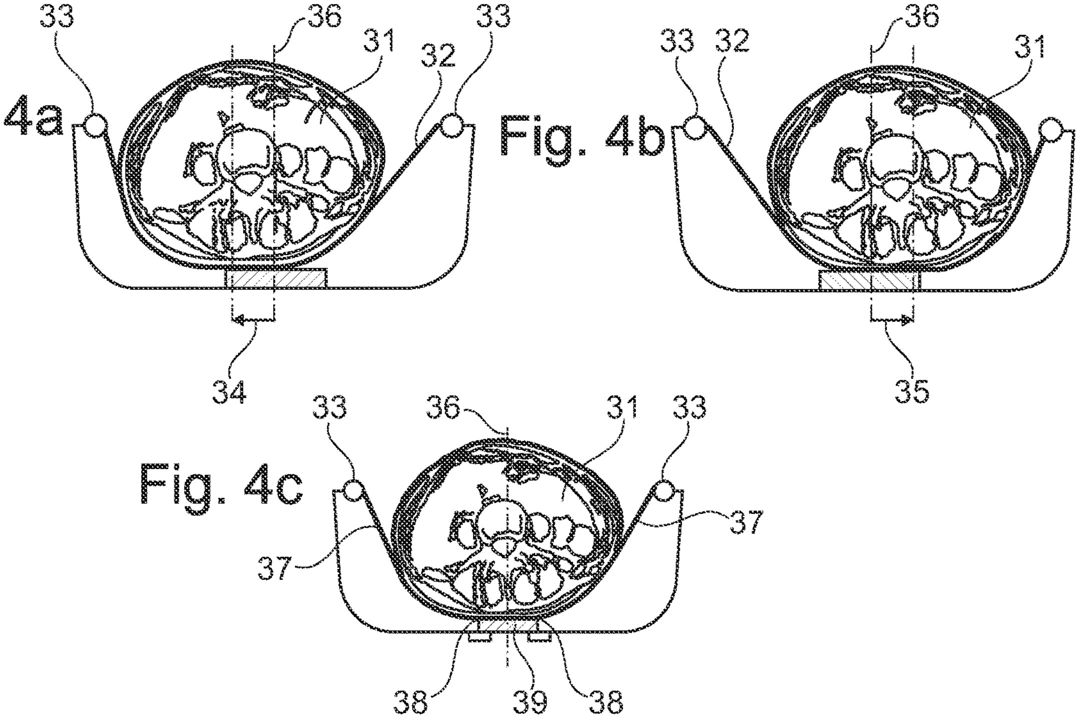
Fig. 4a
Fig. 4b
Fig. 4c

FOLDABLE SEATING DEVICE

CROSS-REFERENCE TO RELATED APPLICATIONS

This application is the United States national phase of International Patent Application No. PCT/NL2022/050283 filed May 24, 2022, and claims priority to The Netherlands Patent Application No. 2028342 filed May 31, 2021, the disclosures of which are hereby incorporated by reference in their entireties.

BACKGROUND OF THE INVENTION

Field of the Invention

The invention relates to a seating device with a seat and backrest extending between a first and a second side of the seating device for the purpose of supporting a seated person, such as for instance a chair or a wheelchair, which seating device is foldable into a collapsed position and a folded-out position.

Description of Related Art

Known foldable seating devices are widely used for being transported or stored in space-saving manner. For instance wheelchairs or compact wheelchairs. Making it foldable allows the wheelchair to be brought along in the loading space of a car in simple manner. Particularly in the case of wheelchairs, they are folded by narrowing them in the width direction by moving the sides or the armrests toward each other. The seat and the backrest then bend or fold in order to enable this movement.

In order to enable this folding movement the seat and the backrest are manufactured from flexible material. The backrest is here usually attached to the vertically oriented frame tubes, to which the handles are also directly or indirectly attached in the case of a wheelchair. Owing to the flexibility of the material of the backrest required for the folding, it is very difficult to provide in the backrest a rigid support for the lumbar-thoracic transition area of a person situated in the seating device in use, while it is precisely this support, preferably in combination with lateral fixation of the upper body, that is necessary for obtaining an anatomically desirable posture of the torso. Due to the lack of support of the lordosis in the lumbar-thoracic transition area, the orientation of back support arranged between the vertical frame tubes is not suitable for supporting the individual curvature of the back either. NL2002388A further discusses an anatomically correct and stable support of a seated person for obtaining the desired sitting posture in respect of the individual curvature.

SUMMARY OF THE INVENTION

It is now an object of the invention to reduce or even obviate the above stated drawback. It is a particular object of the invention to provide a foldable seating device whereby anatomically correct sitting support can be obtained.

This object is achieved according to the invention with a seating device, such as for instance a chair or a wheelchair, with a seat and backrest extending between a first and a second side of the seating device for the purpose of supporting a seated person, which seating device can be folded into a collapsed position and a folded-out position, wherein in the collapsed position the distance between the first and the second side is smaller than in the folded-out position, and which backrest comprises a lumbar-thoracic support surface for supporting in the folded-out position the lumbar-thoracic transition area of a person situated in the seating device during use at a first angle relative to the horizontal plane.

By providing the backrest with a rigid lumbar-thoracic support surface, which in the folded-out position supports the lumbar-thoracic transition area of a person situated in the seating device during use at a desired first angle, an important requirement for enabling anatomically correct support of the back is met. The part of the backrest which is in contact with the back of the person during use is preferably substantially formed here by the lumbar-thoracic support surface which supports the spinal column. This support surface can for instance be lined with a foam-like material so as to increase comfort.

To obtain a rigid support of the lumbar-thoracic transition area the lumbar-thoracic support surface is in the folded-out position preferably fixed in height direction and in lateral direction relative to the seating device. To fix the lumbar-thoracic support surface at a fixed position relative to the seating device a support frame can for instance be used, although support straps can alternatively also be arranged between components of the frame of the seating device, wherein the lumbar-thoracic support surface is fixed at a fixed position relative to the seating device by the support straps.

The seating device according to the invention can be folded between the collapsed and folded-out position without the backrest having to be dismounted or mounted respectively before or after the folding movement. The backrest can thus form a fixed part of the seating device.

In a preferred embodiment of a seating device according to the invention the backrest comprises on either side of the lumbar-thoracic support surface at least one fixation strap for lateral fixation of the upper body of a seated person, wherein the at least one fixation straps are each attached with both outer ends to respectively the lumbar-thoracic support surface and respectively the first and the second side of the seating device.

By arranging at least one fixation strap on both sides of the lumbar-thoracic support surface the upper body can be fixed laterally. The fixation straps follow the contour of the back. The outer ends that are attached to the sides of the seating device are preferably used at the position of the flanks of the person using the seating device, so attached more toward the front edge of the seat. By also attaching the fixation straps to the lumbar-thoracic support surface, fixed in height direction and lateral direction relative to the seating device, in the centre the upper body is fixed in a desired posture in lateral direction. In the case of a support strap which runs from the first to the second side of the seating device without central attachment and which follows the contour of the back the upper body cannot be fixed laterally. By arranging the fixation straps on the lumbar-thoracic support surface this lateral freedom is limited. A desired sitting support can hereby be obtained, wherein a desired posture can be obtained with respect for the individual curvature and wherein there is also lateral fixation of the torso by the fixing straps.

The back-supporting part of the backrest preferably consists of the fixation straps and the lumbar-thoracic support surface. The backrest can hereby be folded up very compactly.

In another embodiment of a seating device according to the invention the length between the outer ends of at least one fixation strap, preferably of all fixation straps, is adjustable.

By including an adjustable fixation strap, wherein the length between the outer ends is adjustable, the provided back support can be adapted to the curvature of the back of the person using the seating device. When several or all fixation straps are adjustable, the contour of the back can be followed and the lateral desired posture of the upper body can be fixed, without being detrimental to the foldability of the backrest or the seating device.

Another embodiment of the seating device according to the invention is a seating device wherein the first angle lies in the range of 117-123°.

The first angle is measured in the sagittal plane relative to a person seated in the seating device, between the lumbar-thoracic support surface and the horizontal plane when the seating device is in ready-to-use state. It is usual to give the seat of a seating device an angle ($\varphi$) relative to the horizontal plane. The seat is then slightly tilted in the direction of the backrest. Angle $\varphi$ generally lies in the range of 18-21°. The sum of the angle ($\alpha$) between the seat and the lumbar-thoracic support surface and angle $\varphi$ defines the functional backrest angle. The first angle is therefore angle $\alpha+\varphi$. By opting for a first angle in the range of 117-123° a stable torso posture is obtained. Angles $\alpha$ and $\varphi$ are also measured in the sagittal plane.

Another preferred embodiment of a seating device according to the invention is a seating device wherein the backrest comprises a support frame which extends between the first and the second side of the seating device, which support frame comprises a first and a second frame segment, which frame segments are mutually connected for pivoting about a central axis and wherein the first and the second frame segment are connected to respectively the first and the second side of the seating device for pivoting about respectively a first and a second side pivot axis, wherein the central pivot axis and the side pivot axes are parallel and which pivot axes form a second angle with the horizontal plane, which second angle is smaller than the first angle.

By providing the backrest of the seating device with a foldable support frame the lumbar-thoracic support surface can be rigidly supported. The support frame has here two frame segments which are mutually connected for pivoting about an imaginary central axis. Because the frame segments are also mounted pivotally on the sides of the seating device, wherein the imaginary pivot axes are parallel to the central axis, the support frame can collapse when the seating device is brought into the collapsed state. The central axis preferably moves here toward the front edge of the seat. The support frame preferably comprises a limiter for the pivoting movement, wherein the frame segments lie mutually in line on the limiter, or wherein the central axis lies in a plane lying behind the plane in which the side pivot axes lie.

The relative height and/or the lateral placement of the lumbar-thoracic support surface relative to the support frame is preferably adjustable, for instance by means of attaching means which allow a relative displacement.

The support frame preferably comprises mounting means for mounting the support frame on the seating device, wherein the angle of the support frame relative to the horizontal plane, as measured in the sagittal plane of a person situated in the seating device, is adjustable. The support frame can hereby be adjusted in simple manner to different frames of a seating device.

The lumbar-thoracic support surface can for instance be connected to the support frame for pivoting about an imaginary horizontal axis, so that in the collapsed position the construction can fold up flat. In the folded-out position the lumbar-thoracic support surface can then fold out for the purpose of obtaining the correct first angle relative to the horizontal. This angle can optionally be obtained by the adjustment of the fixation straps, wherein the fixation straps rotate the lumbar-thoracic support surface about the horizontal axis to the desired position during folding into folded-out position. It is also possible to arrange locking means on the lumbar-thoracic support surface for the purpose of locking the first angle in the supporting position in the folded-out position.

Another embodiment of a seating device according to the invention is a seating device wherein the lumbar-thoracic support surface is attached only structurally to the first frame segment.

For rigid torso support it is important that the lumbar-thoracic support surface is attached rigidly relative to the seating device during use. In order to prevent a reduction of the foldability of the seating device, the lumbar-thoracic support surface is according to the invention attached only structurally to the first frame segment. During folding into the collapsed position the lumbar-thoracic support surface folds along with the first frame segment. The attachment via the support straps is not structural, particularly in combination with a device according to the invention, wherein fixation straps are also applied. The lumbar-thoracic support surface provides a fixed and centrally located point.

In yet another embodiment of a seating device according to the invention the seating device also comprises angle adjusting means, which angle adjusting means are configured to adjust the first angle.

By making the first angle, i.e. angle $\alpha+\varphi$ adjustable, the back support can be adjusted to the individual curvature of the back of the user of the seating device.

Another embodiment of a seating device according to the invention is a seating device wherein the lumbar-thoracic support surface is a rectangle, preferably a rectangle with a width of about 8 cm and a height of about 12 cm.

With a rectangular lumbar-thoracic support surface the lumbar-thoracic transition area can be supported in a desired position. The preferably vertically oriented support surface supports a number of vertebrae, from roughly vertebra L3/L4 to the vertebrae lying thereabove. The rectangle is preferably about 8 cm wide, whereby the spinal column is supported over the whole width, and about 12 cm high, so that the lumbar-thoracic transition area is supported from roughly vertebra L3/L4.

BRIEF DESCRIPTION OF THE DRAWINGS

These and other features of the invention are further elucidated with reference to the accompanying drawings.

The terms Fig., Figs., Figure, and Figures are used interchangeably in the specification to refer to the corresponding figures in the drawings.

FIG. 3 shows a perspective view of the rear side of a second embodiment of a seating device according to the invention.

FIGS. 4*a-c* show a schematic representation of the lateral freedom of an upper body supported by support straps and FIG. 4*c* the lateral fixation of the upper body by the fixation straps according to the invention.

DESCRIPTION OF THE INVENTION

Figure 1:
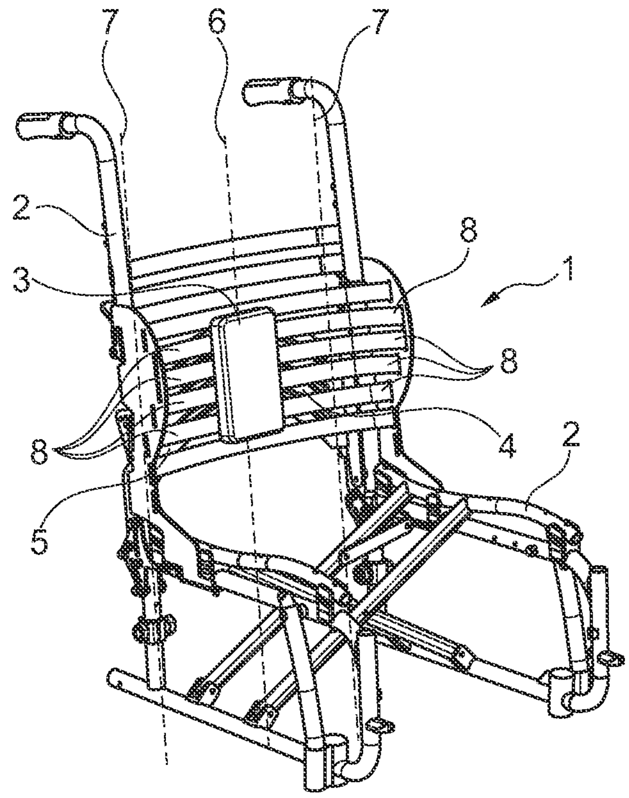
FIG. 1 shows a perspective view of a first embodiment of a seating device according to the invention.

FIG. 1 shows a perspective view of a foldable wheelchair 1 according to the invention. The seat of wheelchair 1 is not shown, making tubular frame 2 of wheelchair 1 visible. The lumbar-thoracic support surface 3 is arranged on the first frame part 4 of the support frame, which also has a second frame part 5. The first 4 and second 5 frame parts are connected to each other for pivoting about an imaginary central pivot axis 6. The other outer ends of frame parts 4, 5 are connected to frame 2 of seating device 1 for pivoting about imaginary side pivot axes 7. Fixation straps 8 are arranged on either side of the lumbar-thoracic support surface 3. The fixation straps 8 are arranged further toward the front edge of the seat (not shown) of wheelchair 1 relative to the lumbar-thoracic support surface 3. Fixation straps 8 hereby form a curve in top view, whereby the contour of the back of a person seated in wheelchair 1 can be followed. The lumbar-thoracic support surface can optionally be connected to first frame part 4 for pivoting about an imaginary horizontal axis, whereby the angle of the lumbar-thoracic support surface 3 relative to the seat or the horizontal surface can be varied further.

Figure 2:
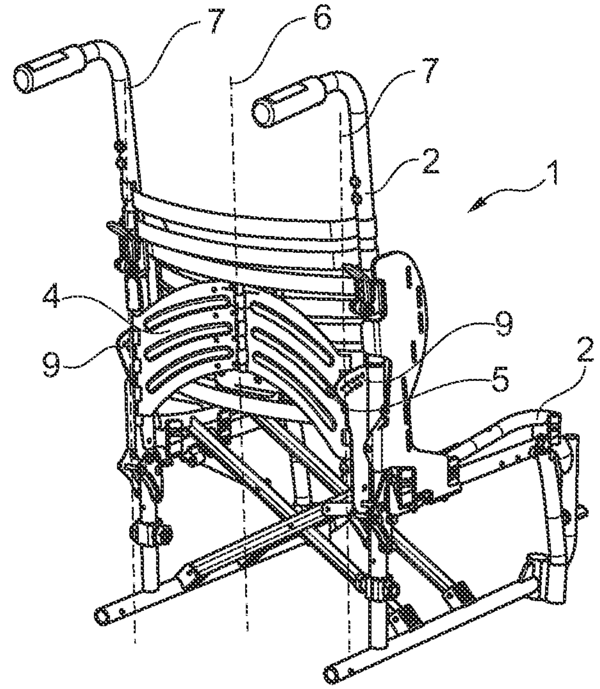
FIG. 2 shows a perspective view of the rear side of the first embodiment according to FIG. 1.

FIG. 2 shows a perspective view of the rear side of frame 2 of the wheelchair 1 according to FIG. 1. The first 4 and second 5 frame parts of the support frame are arranged on frame 2. The position of the support frame relative to frame 2 can be adjusted in simple manner by means of the angle adjusting means 9. The option of varying the relative height of support surface 3 relative to the support frame can be provided by means of for instance slotted holes arranged on the rear side of lumbar-thoracic support surface 3. Fastening holes are arranged in first frame part 4 for attaching the lumbar-thoracic support surface 3.

FIG. 3 shows a perspective view of the rear side of a second embodiment of a wheelchair 21 according to the invention. In this embodiment the lumbar-thoracic support surface 23 is attached relative to frame 22 by means of four straps 24 arranged on frame 22. In the folded-out position of wheelchair 21 the straps 24 are stretched tautly between the two sides of frame 22, whereby the lumbar-thoracic support surface 23 is fixed in height direction and lateral direction relative to frame 22. The relative position of the lumbar-thoracic support surface 23 relative to the seating device can optionally be varied by adjusting the length of straps 24, whereby the lengths of the different straps 24 must of course be adapted to each other so as to obtain the necessary fixation of the lumbar-thoracic support surface 23. In the collapsed position of wheelchair 21 the straps 24 are not tensioned and wheelchair 21 can be collapsed normally. As in the embodiment of FIGS. 1 and 2, the fixation straps 28 are arranged on the lumbar-thoracic support surface 23 and the sides of frame 22.

FIGS. 4*a* and 4*b* show a schematic cross-section in the transverse plane of the lateral freedom of an upper body 31 when supported by a support strap 32 attached to fixed lateral attachments 33 on either side of upper body 31. Support strap 32 follows the contour of upper body 31. FIGS. 4*a* and 4*b* show respectively a lateral translation 34 and 35 of upper body 31 relative to the centre line 36 of a lumbar-thoracic support surface 39. Upper body 31 is not laterally fixed by the support strap 32, whereby the upper body can move in the direction of the arrows 34-35, roughly parallel to the line between lateral attachments 33. FIG. 4*c* shows the lateral fixation by the fixation straps according to an embodiment according to the invention. Fixation straps 37 are connected at the outer ends to the lateral attachments 33 on one side and to a, or each to a, fixed central attachment 38 on the other. Because the freedom in the fixation straps 37 now exists roughly parallel to the line between a lateral attachment 33 and the fixed central attachment(s) 38, and these lines are not mutually in line, the upper body 31 supporting against both fixation straps 37 is fixed in lateral direction. A desired sitting support is hereby obtained, wherein the upper body is also fixed laterally. According to the invention, the lumbar-thoracic support surface 39 serves as fixed central attachment 38 because it is fixated at least in lateral direction relative to the seating device.

Figure 5:
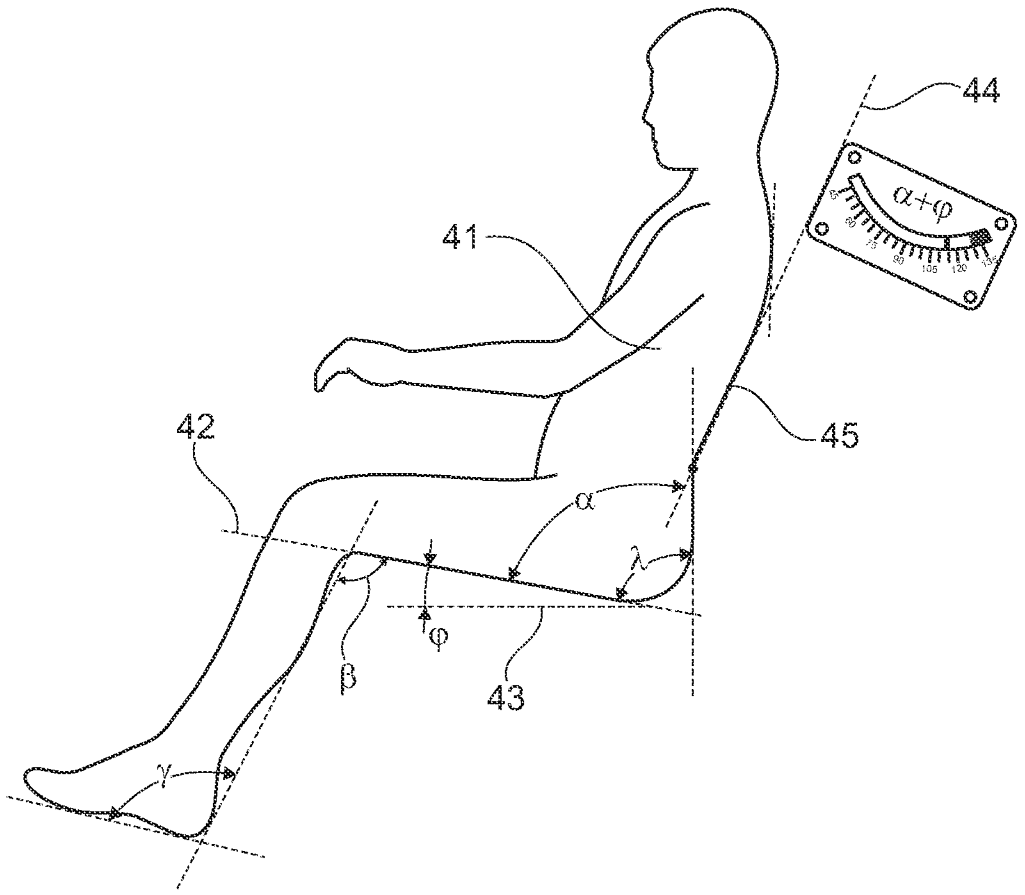
FIG. 5 shows a schematic definition of the angles in the sagittal plane.

FIG. 5 shows a schematic view at right angles to the sagittal plane of the shown silhouette 41 of a seated person, in which the angles $\alpha$ and $\varphi$ are indicated in the sagittal plane. The seat surface 42 forms an angle $\varphi$ with the horizontal plane 43. The contact surface 44 with the lumbar-thoracic support surface 45 forms an angle $\alpha$ with seat surface 42. The first angle of the lumbar-thoracic support surface 45 relative to the horizontal plane 43 is therefore the sum of the angles $\alpha$ and $\varphi$.

The invention claimed is:

1. A seating device, comprising:

a seat and a backrest extending between a first and a second side of the seating device for the purpose of supporting a seated person, wherein the seating device can be folded into a collapsed position and a folded-out position, wherein in the collapsed position the distance between the first and the second side is smaller than in the folded-out position, wherein the backrest comprises a rigid lumbar-thoracic support surface for supporting in the folded-out position the lumbar-thoracic transition area of a person situated in the seating device during use at a first angle relative to the horizontal plane, wherein the lumbar-thoracic support surface extends outwardly from the backrest toward the person situated in the seating device, wherein the backrest further comprises on each side of the lumbar-thoracic support surface, at least one fixation strap configured for lateral fixation of an upper body of the seated person, wherein each fixation strap is attached at a first end to the lumbar-thoracic support surface and at a second end to a respective one of the first side and the second side of the seating device, wherein the backrest comprises a support frame which extends between the first and the second side of the seating device, wherein the support frame comprises a first and a second frame segment, wherein the first and second frame segments are mutually connected for pivoting about a central axis, wherein the first and the second frame segment are connected to respectively the first and the second side of the seating device for pivoting about respectively a first and a second side pivot axis, and wherein the lumbar-thoracic support surface is attached only structurally to the first frame segment.

2. The seating device according to claim 1, wherein the length between the outer ends of the at least one fixation strap, is adjustable.

3. The seating device according to claim 1, wherein the first angle lies in the range of 117-123°.

4. The seating device according to claim 1, wherein the first angle is adjustable.

5. The seating device according to claim 1, wherein the lumbar-thoracic support surface is a rectangle with a width of about 8 cm and a height of about 12 cm.

* * * * *